United States Patent
White et al.

(10) Patent No.: US 7,657,690 B1
(45) Date of Patent: Feb. 2, 2010

(54) CONTROL OF PCI MEMORY READ BEHAVIOR USING MEMORY READ ALIAS AND MEMORY COMMAND REISSUE BITS

(75) Inventors: Sean T. White, Westborough, MA (US); Jonathan Mercer Owen, Northboro, MA (US)

(73) Assignee: GLOBALFOUNDRIES Inc.

( * ) Notice: Subject to any disclaimer, the term of this patent is extended or adjusted under 35 U.S.C. 154(b) by 889 days.

(21) Appl. No.: 11/151,318

(22) Filed: Jun. 14, 2005

(51) Int. Cl.
*G06F 13/36* (2006.01)
*G06F 13/20* (2006.01)

(52) U.S. Cl. ..................... 710/310; 710/313
(58) Field of Classification Search ............... 710/107, 710/113, 305, 310, 313, 309
See application file for complete search history.

(56) References Cited

U.S. PATENT DOCUMENTS

| | | | | |
|---|---|---|---|---|
| 5,815,677 A * | 9/1998 | Goodrum | ............ | 710/310 |
| 5,850,530 A * | 12/1998 | Chen et al. | ............ | 710/113 |
| 5,884,052 A * | 3/1999 | Chambers et al. | ............ | 710/107 |
| 5,931,932 A * | 8/1999 | Kanekal | ............ | 710/113 |
| 6,170,030 B1 * | 1/2001 | Bell | ............ | 710/310 |
| 6,286,074 B1 * | 9/2001 | Batchelor et al. | ............ | 710/305 |
| 6,502,157 B1 * | 12/2002 | Batchelor et al. | ............ | 710/310 |
| 6,625,683 B1 * | 9/2003 | Khan et al. | ............ | 710/313 |
| 6,728,808 B1 * | 4/2004 | Brown | ............ | 710/107 |
| 6,973,528 B2 * | 12/2005 | Bronson et al. | ............ | 710/310 |
| 7,107,384 B1 * | 9/2006 | Chen et al. | ............ | 710/309 |
| 2005/0182886 A1 * | 8/2005 | Edirisooriya et al. | ............ | 710/310 |

OTHER PUBLICATIONS

PCI Special Interest Group, PCI-to-PCI Bridge Architecture Specification, Dec. 18, 1998, PCI-SIG, Revision 1.1, pp. 69-70.*
"AMD-3181™ HyperTransport™ PCI-X® Tunnel Data Sheet", 24637 Rev. 3.02, Aug. 10, 2004, pp. 1-87.

* cited by examiner

*Primary Examiner*—Thomas J Cleary
(74) *Attorney, Agent, or Firm*—Manelli Denison & Selter PLLC; Leon R. Turkevich; Edward J. Stemberger

(57) ABSTRACT

A method of controlling memory read behavior in PCI devices includes connecting a master PCI device to a PCI bus. The master PCI device is constructed and arranged to issue a Memory Read Line or a Memory Read Multiple initial command. A target PCI bridge device is connected to the PCI bus. The target PCI bridge device is constructed and arranged to prefetch data from host memory on behalf of the master PCI device and to store the prefetched data. A data transfer transaction is established between the master PCI device and the target PCI bridge device and prefetched data is stored at the target PCI bridge device. A bit is selectively preset in at least one of the PCI devices such that if a disconnect of the transaction occurs, the target PCI bridge device recognizes a subsequent request as a continuation of the initial request and sends prefetched data to the master PCI device.

13 Claims, 2 Drawing Sheets

CONTROL OF PCI MEMORY READ BEHAVIOR USING MEMORY READ ALIAS AND MEMORY COMMAND REISSUE BITS

BACKGROUND OF THE INVENTION

1. Field of the Invention

The present invention relates to Peripheral Component Interconnect (PCI) devices and, more particularly, to a system and method for control of PCI memory read behavior when a disconnect occurs in mid data transfer between a master PCI device and a target PCI device.

2. Background Art

In a PCI system including a master that requests data from a memory storage device, the master does not necessarily communicate directly with the memory storage device. Typically, there is a bridge device between the master and the memory storage device. The bridge receives requests from the master on behalf of the memory, and may retry the master while it requests data from memory. The master may in fact be retried multiple times while the bridge is waiting for the data. When the bridge has obtained the data, and the master reissues its request, the bridge returns the data to the master. A request handled in this manner is referred to in PCI as a delayed request.

PCI read requests do not include length information, although some hints are provided through the fact that PCI includes several types of memory read commands. The only explicit information that the master can put in its request is that the master wants to receive at least one beat of data (e.g., 4 or 8 bytes) starting at a certain address. The bridge must make a determination of how much data to request from memory, based on the command used. If more than the initial beat of data is fetched from memory, that is referred to as prefetching, since the subsequent data beats have not actually yet been requested by the master. However, making assumptions as to the amount of data that the master is requesting raises certain issues. For example, if the bridge device reads more data than the master wants, system memory bandwidth is wasted since data is fetched that is not wanted. Furthermore, certain data is not prefetchable such as data that if read, is affected (e.g., a counter that increments when read). In this case, if data is read by the bridge device that is not requested by the master, the data may be destroyed. If the bridge initially reads less data than the master wants, it will run out of data when the reconnection occurs, forcing a disconnection (and possibly more retries) while it goes back to the memory for more data, again wasting PCI bus bandwidth and incurring extra latency.

The base memory read command in PCI is the Memory Read command. It conveys no length information beyond the first beat on the PCI bus and no prefetchability information. Accordingly, it is not possible in general for the bridge to safely prefetch. The bridge would therefore be expected to fetch data from memory 4 or 8 bytes at a time. When the master reconnects, the 4 or 8 bytes would be transferred and the bridge would then disconnect the transaction due to having no more data stored. If the master wants more than 4 or 8 bytes, it must reissue its request at the disconnected address, and the process must start over again. Hence, in this situation, performance is greatly limited since only 4 or 8 bytes of data are being received at a time.

The PCI Local Bus Specification Revision 2.3 dated Mar. 29, 2002 (hereinafter, the PCI Specification) defines, in addition to Memory Read, a Memory Read Line, and a Memory Read Multiple memory read command. Memory Read Line is used when reading more than 4 or 8 bytes such as an entire cacheline or up to an end of a cacheline. Memory Read Multiple is used when reading all or part of a first cacheline and at least one cacheline beyond the first cacheline.

Thus, as noted above, when a Memory Read command is used, a PCI target (e.g., bridge device) will generally obtain only the data that a master requested. The bridge device cannot read more because it does not know which bytes are required for the next data phase since that information is not available until the current data phase completes and the data may not be prefetchable. For Memory Read Line and Memory Read Multiple commands however, the master guarantees the address range is prefetchable; thus the bridge device can safely obtain more data than requested by the master, which is more efficient than Memory Read.

The bridge may be servicing delayed requests from several masters or several delayed requests from a single master at the same time. Accordingly, when the bridge receives a request, it must have a way to determine whether that request is a new request (which may need to be enqueued as a delayed request), or whether it is a reissue of a request that was previously retried or disconnected. This determination is made by comparing the command type, address, and (under some circumstances) byte enables of the stored request to the incoming request to see if they match.

When a master wants a large amount of data, and if the Memory Read Multiple command is used, the bridge device will fetch an amount of data. If the fetched amount of data is not as much as the amount of data the master wanted, the bridge will disconnect the data transfer when it runs out of data and the master will need to reissue the Memory Read Multiple command. If the bridge recognizes the reissued command as being part of the same transaction that was previously disconnected, and has had time to fetch more data from memory in the meantime, it will provide that data to the master. Since there was a disconnect and the master needs to reissue its request, it will be seeking a lesser amount of data because the bridge device already provided some data to the master.

The PCI Specification specifies which of the three read commands (mentioned above) a master may issue depending on the amount of data the master wants to receive. In the above example, since the master requires only a small amount of data, the master issues a Memory Read command instead of a Memory Read Multiple command. However, the bridge device has stored internally, the previous Memory Read Multiple command starting at a certain address. When the Memory Read is received, the address will match, but the command will not. Thus, the bridge device will treat the Memory Read command as a different request and will fetch the data over again increasing latency and wasting bandwidth both at memory and on the PCI bus. In addition, a buffer of the bridge contains the earlier Memory Read Multiple data that may need to be discarded. If the buffered data is not discarded and the same address is read later using a Memory Read Multiple command, the data may have gone stale or changed in memory. Thus, instead of the bridge device fetching data for the later Memory Read Multiple command, the bridge device may provide a master with stale data that associated with the earlier Memory Read Multiple command.

Hence, in certain PCI implementations, after a disconnect, there is a need for a bridge device to recognize a subsequent read request with a different command as a continuation of a previous read request. Furthermore, when dealing with a bridge device that is not able to recognize a different read command as a continuation, there is a need for a PCI master to be able to reissue the same command following a disconnect, even if the amount of data remaining to be requested in the reissued command is such that a different command would normally be appropriate.

SUMMARY OF THE INVENTION

An object of the present invention is to fulfill the needs referred to above. In accordance with the principles of the present invention, these objectives are achieved by providing a method of controlling memory read behavior in PCI devices. The method includes connecting a master PCI device to a PCI bus. The master PCI device is constructed and arranged to issue a Memory Read Line or a Memory Read Multiple initial command. A target PCI bridge device is connected between the PCI bus and host memory. The target PCI bridge device is constructed and arranged to prefetch data, from the memory starting at a requested address, on behalf of the master PCI device and to store the prefetched data. A data transfer transaction is established between the master PCI device and the target PCI bridge device and prefetched data is stored at the target PCI bridge device. A bit is selectively preset in at least one of PCI devices such that if a disconnect of the transaction occurs, the target PCI bridge device recognizes a subsequent request as a continuation of the initial request and sends prefetched data to the master PCI device.

In accordance with another aspect of the invention, a target PCI bridge device includes a prefetch data buffer constructed and arranged to store prefetched data on behalf of a master PCI device. A bit of the target PCI bridge device is set such that if a disconnect of a transaction between the target PCI bridge device and the master PCI device occurs, the target PCI bridge device recognizes a subsequent read command as a continuation of a previously received read command and sends prefetched data to the master PCI device.

In accordance with yet another aspect of the invention, a master PCI device includes a command structure constructed and arranged to send a Memory Read Line or a Memory Read Multiple command to a target PCI device. A bit of the master PCI device is set such that if a disconnect of a transaction between the target PCI device and the master PCI device occurs, the master PCI device reissues the original command upon reconnection with the target PCI device regardless of how much more data the master wants, which enables the target PCI device to recognize the request as a continuation of the original transaction.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
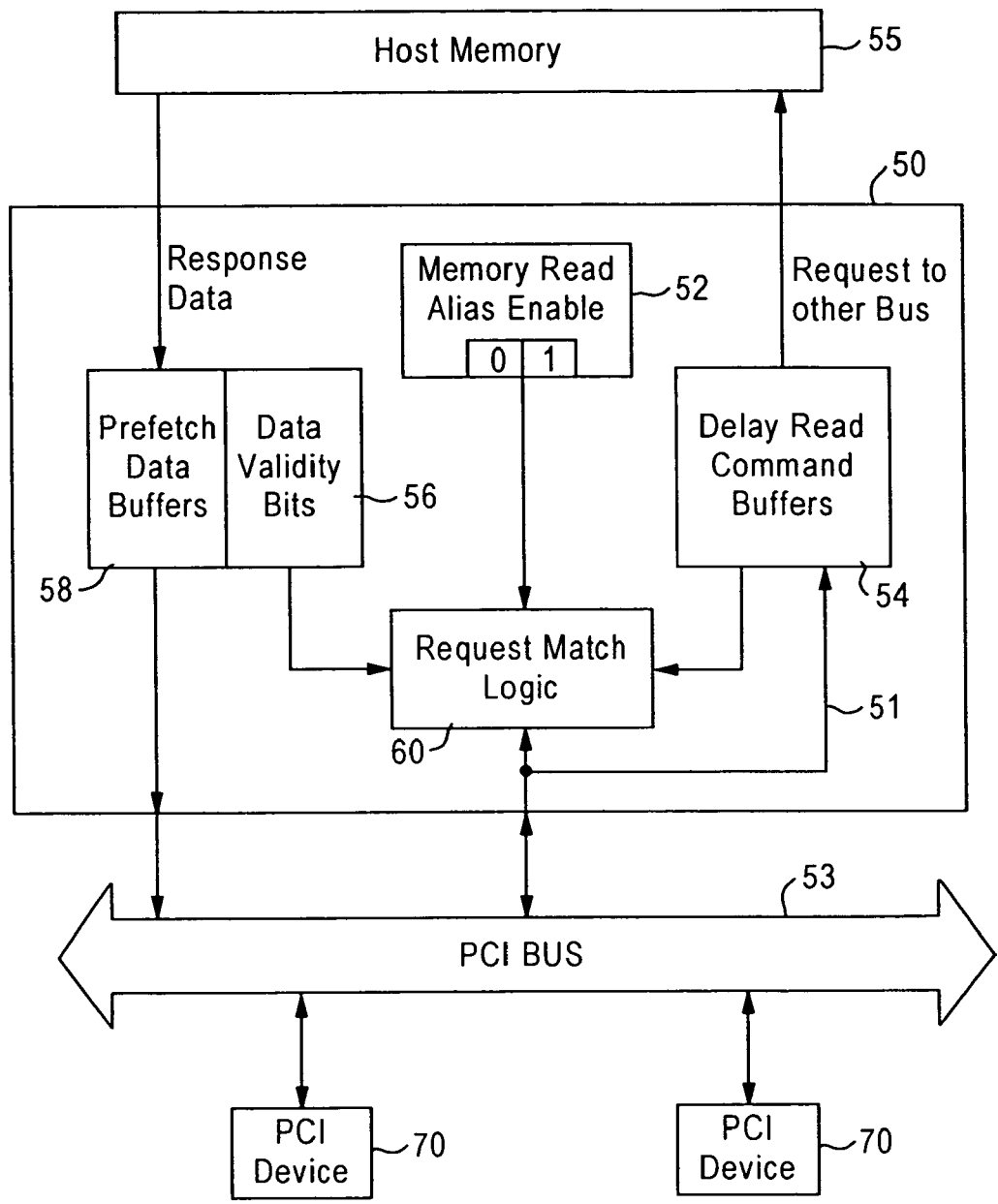
FIG. 1 is a block diagram of a PCI based system showing PCI devices and a PCI bridge device connected with a PCI bus, with the PCI bridge having a Memory Read Alias Enable bit selectable according to an embodiment of the present invention.

FIG. 1 is a diagram illustrating a target device or PCI bridge device 50 shown connected between host memory 55 and a PCI bus 53 according to an embodiment of the invention. Other PCI devices 70 are also connected to the bus 53.

In accordance with the embodiment, the target PCI bridge device 50 includes the Memory Read Alias Enable bit 52. When the bit 52 is cleared (set to 0), a read request 51 (Memory Read, Memory Read Line or Memory Read Multiple) from a master PCI device 70 must match an entry in the Delay Read Command Buffers 54 exactly (the read request must have the same command, address, or Request 64 bit Transfer (REQ64#) as an entry in the Read Command Buffers 54) and there must be valid data 56 in the Prefetch Data Buffers 58 for the PCI device 70 to receive data from the bridge device 50. A Request Match Logic 60 determines if valid data 56 is present and if the read request 51 matches an entry in the Delay Read Command Buffers 54. Thus, when bit 52 is cleared, the bridge 50 is functioning in compliance with the PCI Specification and when a disconnect occurs as explained above, and is reissued with a different command type, a different transaction is defined and data in the prefetch buffers 58 is typically discarded.

Devices in certain system environments need not operate in strict compliance with the PCI Specification and thus, read behavior can be controlled to be more efficient for these devices. Thus, in accordance with the embodiment of FIG. 1, the Memory Read Alias Enable bit 52 can be set to 1 such that differences in the memory read command (Memory Read, Memory Read Line or Memory Read Multiple) are ignored by the Match Logic 60 and the state of the REQ64# is also ignored for the purposes of determining when a PCI device 70 may reconnect a delayed read request that the bridge device 50 has prefetched data for, after the initial reconnect. This advantageously allows the bridge device 50 to recognize a subsequent read request as a continuation of the initial read request. Thus, the bridge device 50 will send prefetched data to the master PCI device 70 that would otherwise be discarded if the bit 52 were cleared (when the requesting device changed the read command type and/or the state of the REQ64# pin when it attempted to read the rest of the desired data after a disconnect).

Figure 2:
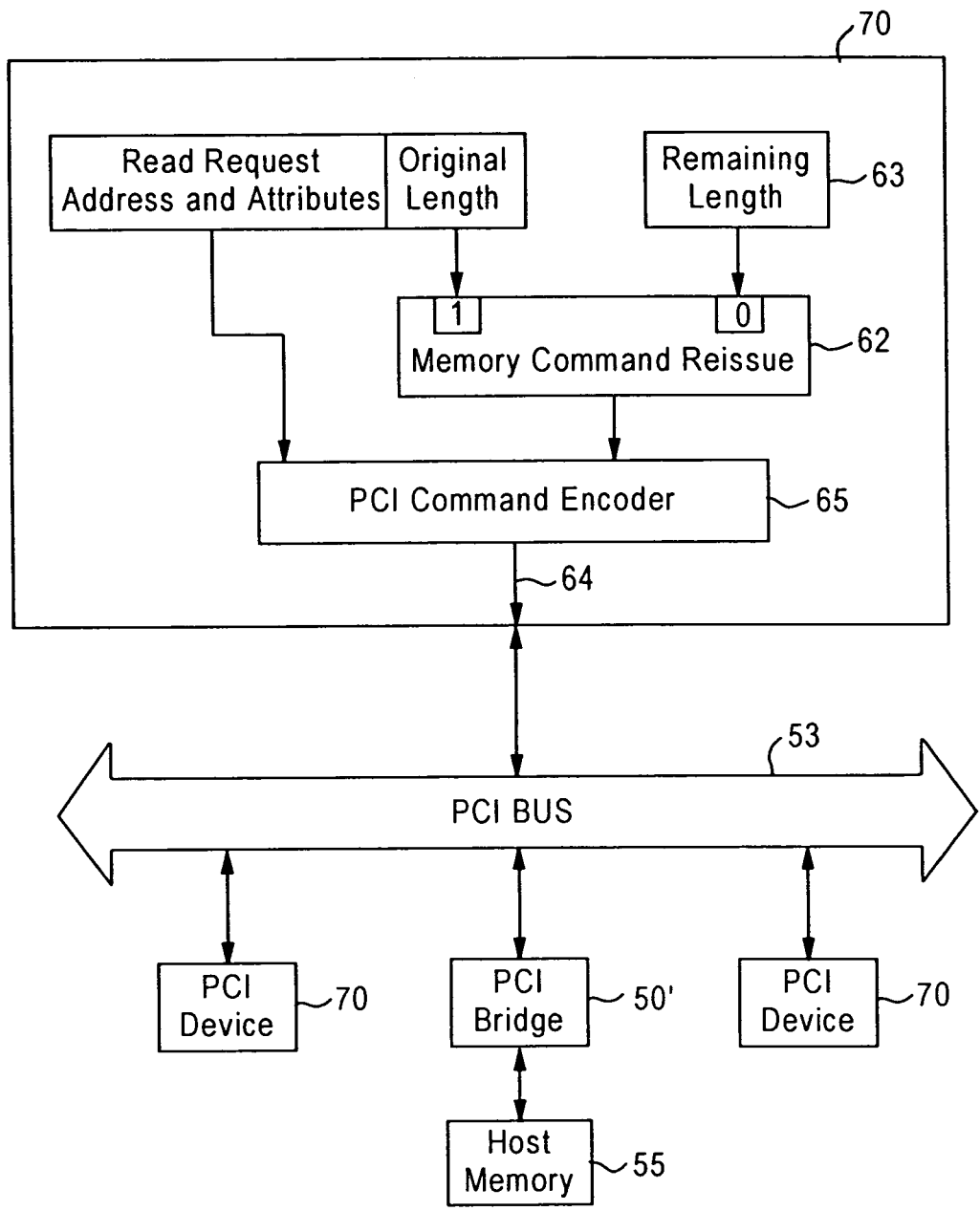
FIG. 2 is a block diagram of a PCI based system showing PCI devices and a PCI bridge device connected with a PCI bus, with one PCI device having a Memory Command Reissue bit selectable according to an embodiment of the present invention.

If a PCI device 70 knows that it is dealing with a target PCI device (a bridge device or other device) that does not have the above-defined Memory Read Alias bit, wherein the target device is always looking for the same read request issued by the PCI device 70, in accordance with the embodiment shown in FIG. 2, the PCI device 70 may be constructed and arranged upon disconnect to selectively reissue the Memory Read Line or Memory Read Multiple command even though only a small amount of data is being requested.

Thus, as shown in FIG. 2, the device 70 includes a selectable Memory Command Reissue bit 62. When bit 62 is cleared (set to 0), the appropriate Memory Read, Memory Read Line or Memory Read Multiple command 64 is issued by the device 70 through a PCI Command Encoder 65 according to Remaining Length 63. After a partial data transfer and disconnect of a transaction, the read command may be (depending on the Remaining Length 63 of the data wanted by the master) changed to shorter Memory Read (or Memory Read Line if the initial command 64 was Memory Read Multiple), thus satisfying the strictest requirements of the PCI specification.

If the PCI device 70 is not in an operating environment where it needs to function under the strict requirements of the PCI Specification with regard to memory read behavior, the Memory Command Reissue bit 62 can be set to 1 such that a Memory Read Line or Memory Read Multiple command 64 will not be changed to the shorter Memory Read (or Memory Read Line in the case of an initial Memory Read Multiple command) after an partial data transfer and disconnect. Thus, the read command 64 is reissued even if the address of the next data or the Remaining Length 63 of the desired data does not satisfy the requirements of Memory Read Line or Memory Read Multiple commands. Hence, higher performance can be achieved when the read command 64 goes through the prefetching bridge 50' since the bridge 50' will not have to discard the any prefetched read data but and re-fetch the data from memory, but can instead return the prefetched data, resulting in more efficient use of the available bandwidth of the PCI bus 53.

In accordance with the embodiment, to ensure strict compliance with the PCI specification, the bit 62 is cleared (0) in the PCI device 70 and/or in the PCI bridge device 50, bit 52 is cleared. If a system designer knows that none of the devices 70 that would be associated with the bridge device 50 would have their operating models broken by violating the PCI specification by ignoring read command changes, the designer can preset bit 62 to 1 in the PCI device 70 and/or preset bit 52 to 1 in the PCI bridge device 50 to continue a previous transaction and thus improve performance by not discarding prefetched data.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of controlling memory read behavior in PCI devices, the method including:
    connecting a master PCI device to a PCI bus, the master PCI device being constructed and arranged to issue a memory read command as one of a Memory Read Line or Memory Read Multiple initial command,
    connecting a target PCI bridge device to the PCI bus, the target PCI bridge device being constructed and arranged to prefetch data on behalf of the master PCI device from host memory and to store the prefetched data,
    establishing a data transfer transaction between the master PCI device and the target PCI bridge device,
    storing prefetched data at the target PCI bridge device, and
    if a disconnect of the transaction occurs, ignoring changes in the memory read command so that the target PCI bridge device recognizes a subsequent request as a continuation of the initial request and sends prefetched data to the master PCI device.

2. The method of claim 1, wherein the prefetched data is stored in buffer of the PCI bridge device.

3. The method of claim 1, wherein the step of ignoring includes setting a Memory Command Reissue bit in the master PCI device to 1.

4. The method of claim 1, wherein the step of ignoring includes setting a Memory Read Alias Enable bit in the target PCI bridge device to 1 and the method further includes ignoring a REQ64# signal at the target PCI bridge device.

5. A method of controlling memory read behavior in a PCI device, the method including:
    connecting a master PCI device to a PCI bus, the master PCI device being constructed and arranged to issue a memory read command as one of a Memory Read Line, or Memory Read Multiple command to target PCI device connected to the PCI bus,
    establishing a data transfer transaction between the master PCI device and the target PCI device,
    if a disconnect of the transaction occurs, ignoring changes in the memory read command and reissuing said command by the master PCI device upon reconnect regardless of how much more data the master PCI device wants to receive, which enables the target PCI device to recognize the command as a continuation of the original transaction.

6. The method of claim 5, wherein the step of ignoring includes setting a Memory Command Reissue bit in the master PCI device to 1.

7. A method of controlling memory read behavior in a PCI device, the method including:
    connecting a master PCI device to a PCI bus, the master PCI device being constructed and arranged to issue a memory read command as one of a Memory Read Line or Memory Read Multiple initial command to a target PCI bridge device connected to the PCI bus, the target PCI bridge device being constructed and arranged to prefetch data from host memory on behalf of the master PCI device and to store the prefetched data,
    establishing a data transfer transaction between the master PCI device and the target PCI bridge device,
    storing prefetched data at the target PCI bridge device, and
    if a disconnect of the transaction occurs, ignoring changes in the memory read command so that the target PCI bridge device recognizes a subsequent command as a continuation of the initial command and sends prefetched data to the master PCI device.

8. The method of claim 7, wherein the prefetched data is stored in buffer of the target PCI bridge device.

9. The method of claim 8, wherein the step of ignoring includes setting a Memory Read Alias Enable bit in the target PCI bridge device to 1 and the method further includes ignoring a REQ64# signal at the target PCI bridge device.

10. A target PCI bridge device comprising:
    a prefetch data buffer constructed and arranged to store prefetched data on behalf of a master PCI device, and
    means for ignoring changes in a memory read command such that if a disconnect of a transaction between the target PCI bridge device and the master PCI device occurs, the target PCI bridge device recognizes a subsequent read command as a continuation of a previously received read command and sends prefetched data to the master PCI device.

11. The device of claim 10, wherein the means for ignoring is a Memory Read Alias Enable bit set to 1.

12. A master PCI device comprising:
    a command structure constructed and arranged to send a memory read command as one of a Memory Read Line or a Memory Read Multiple command to a target PCI device, and
    means for ignoring changes in the memory read command such that if a disconnect of a transaction between the target PCI device and the master PCI device occurs, the master PCI device reissues said command upon reconnection with the target PCI device regardless of how much data the master PCI device wants to receive.

13. The device of claim 12, wherein the means for ignoring is a Memory Command Reissue bit set to 1.

* * * * *